O. O. WILCOX.
VEHICLE ANCHORING MEANS FOR RAILWAY CARS.
APPLICATION FILED JUNE 10, 1918.
1,333,144.
Patented Mar. 9, 1920.
2 SHEETS—SHEET 1.
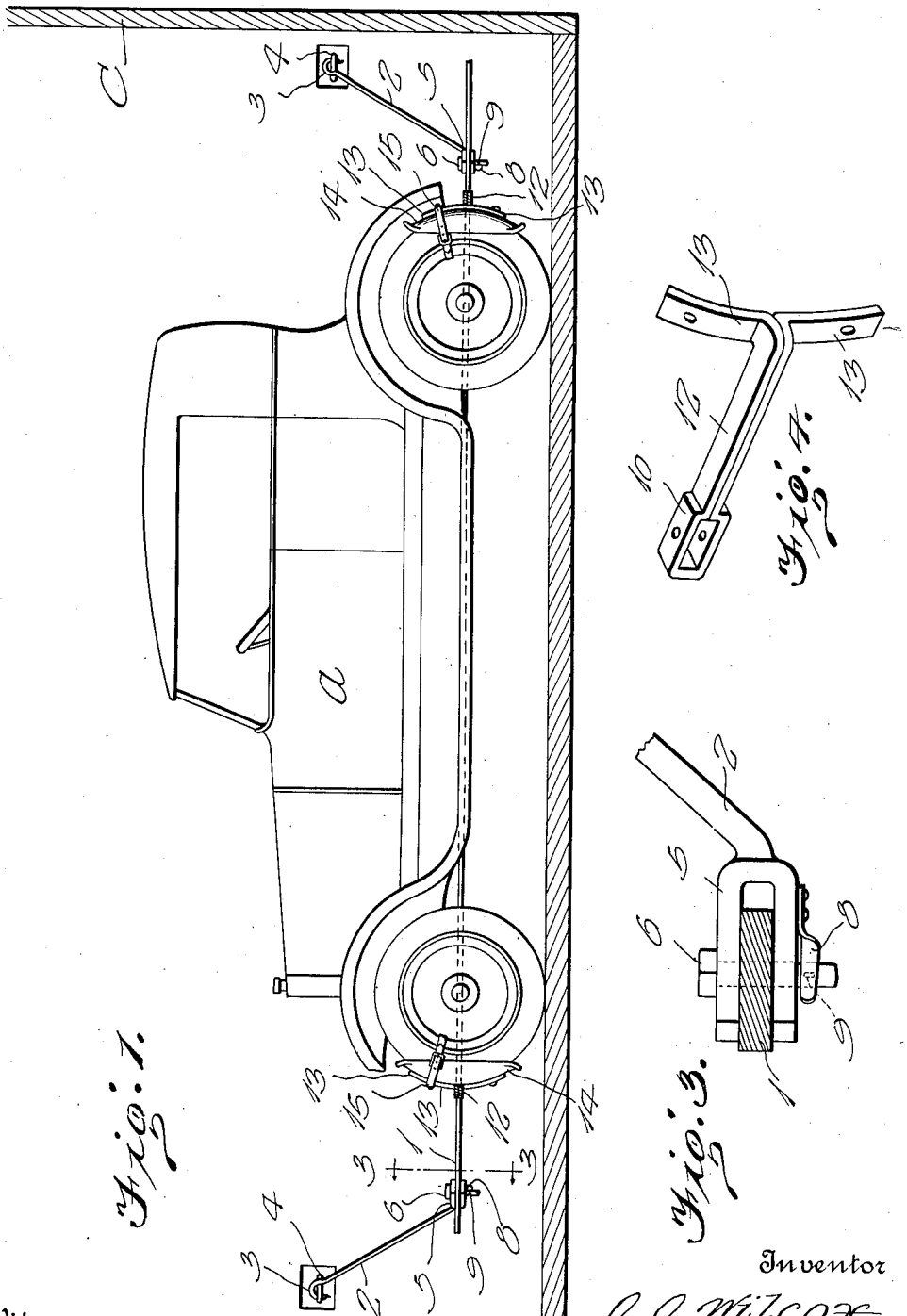

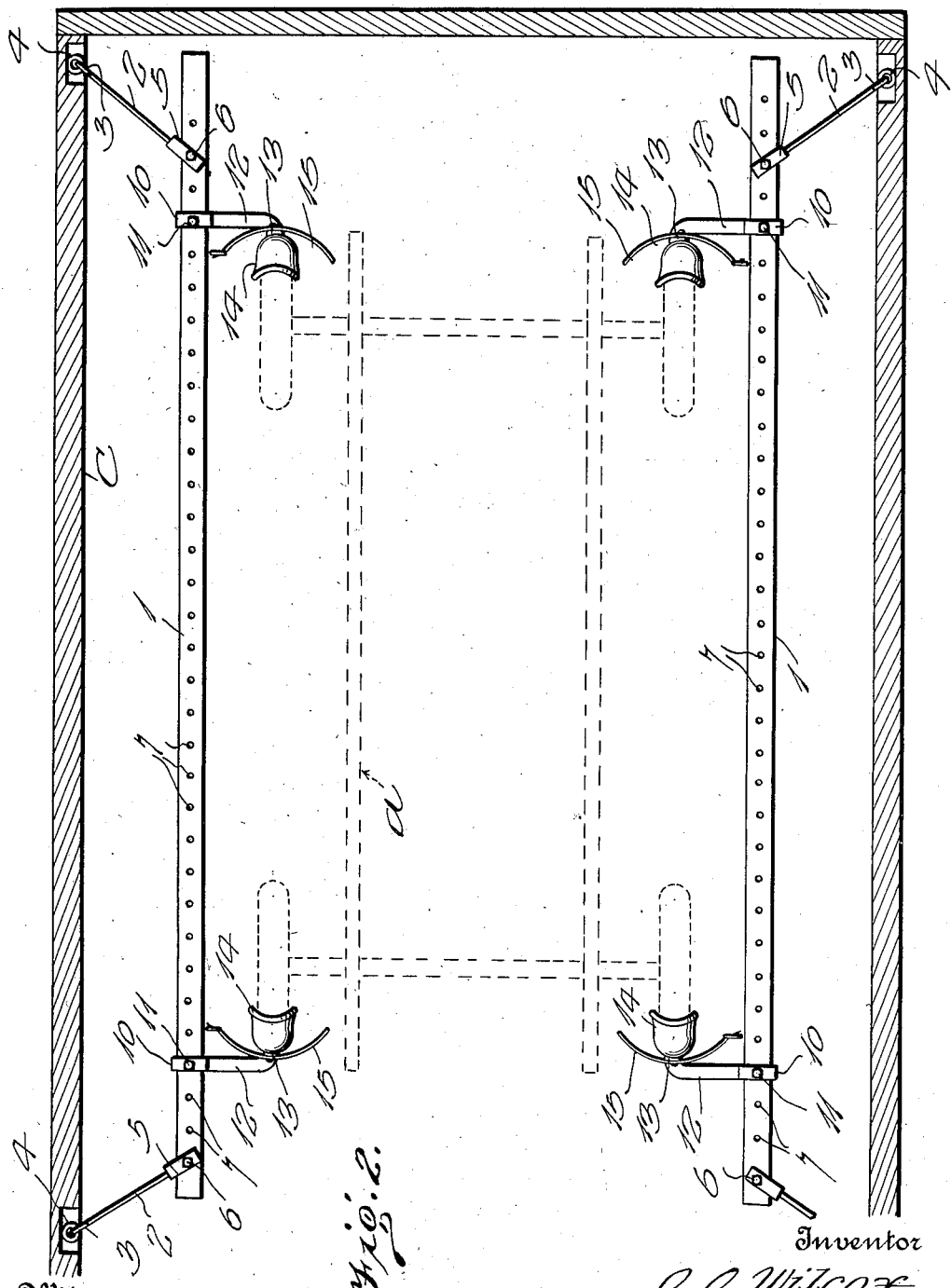

UNITED STATES PATENT OFFICE.

ORLA O. WILCOX, OF DENVER, COLORADO.

VEHICLE-ANCHORING MEANS FOR RAILWAY-CARS.

1,333,144. Specification of Letters Patent. Patented Mar. 9, 1920.

Application filed June 10, 1918. Serial No. 239,188.

*To all whom it may concern:*

Be it known that I, ORLA O. WILCOX, a citizen of the United States, residing at Denver, in the county of Denver and State of Colorado, have invented certain new and useful Improvements in Vehicle-Anchoring Means for Railway-Cars; and I do declare the following to be a full, clear, and exact description of the invention, such as will enable others skilled in the art to which it appertains to make and use the same.

My invention has for its object to provide an improved and comparatively simple and inexpensive, yet highly efficient and durable means for anchoring automobiles and other vehicles in railway cars of ordinary construction for shipment, without the necessity of spiking timbers and the like to the car floor or providing the car with any permanent attachment.

A further object is to provide an improved device of this character that eliminates obstructions such as would interfere with the loading of the car, or be interfered with or injured by material loaded in the car.

With the foregoing object in view, the invention resides in the novel construction and unique combinations of parts to be hereinafter fully described and claimed, the descriptive matter being supplemented by the accompanying drawings which form a part of this application and in which:

Figure 1 is a longitudinal section of a portion of a freight car equipped with my invention and showing the latter applied to an automobile;

Fig. 2 is a horizontal section of the car showing a top plan view of the automobile anchoring means and illustrating the machine in dotted lines;

Fig. 3 is a detail vertical section on the plane of the line 3—3 of Fig. 1; and

Fig. 4 is a perspective view of one of the adjustable slides and arms which carry the wheel engaging shoes.

In the drawings above briefly described, the numerals 1 designate a pair of preferably metal bars disposed longitudinally in a freight car C above the floor thereof and adapted for disposition on opposite sides of the automobile A to be anchored. Anchor rods 2 extend obliquely and upwardly from the ends of the bars 1 and are provided on their upper ends with hooks 3 engaging eyes 4 which are preferably inset in the sides of the car as shown. Any preferred connections could be employed between the lower ends of the rods 2 and the bars 1, but I prefer to provide said rods with forks 5 receiving the bars therein, pins 6 being insertible through alined openings in the fork arms and through certain of the openings 7 which are provided at spaced intervals along the bars 1. It will be understood that any preferred locking devices such as cotters could well be employed for securing the pins 6 in place, but I prefer to provide spring catches carried permanently on the forks 5 as featured in Fig. 3. In this figure, springs 8 are shown secured to the forks and carrying pins 9 for passage through openings in the lower end of the pins 6. By this arrangement, the pins 6 will be held in place while in use yet may be readily removed whenever necessary.

Slides 10 are adjustable along the bars 1 by any preferred means such as the pins 11 for passage through the openings 7, said pins being in most cases provided with locking means similar to that featured in Fig. 3 and above described. Arms 12 extend laterally inward from the slides 10 and are shown as provided on their free ends with vertical branches 13 riveted or otherwise secured to channel-shaped or concaved tire-receiving members or shoes 14 adapted to engage the wheels of the vehicle as shown clearly in Figs. 1 and 2, thus effectively anchoring the machine in the car. For additional security, straps 15 are preferably secured to the shoes 14 for passage around the tires and rims in the manner seen clearly in Fig. 1.

Each slide 10, its arm 12, and the arm branches 13, are preferably formed of a single metal bar or strip bent upon itself at its center to form a closed loop which constitutes the slide, the two halves of said bar then continuing in parallel relation to provide the arm 12, while the free ends of said halves are bent vertically in opposite directions to form the branches 13, this construction being disclosed clearly in Fig. 4.

In using this device, the bars 1 may be first attached to the eyes 4 by means of the anchor rods 2, the slides 10 then are adjusted along the bars 1 until the shoes 14 tightly engage the tires of the machine, the locking pins 11 are then forced in place and locked, and finally the straps 15 are fastened. The machine is thus rigidly anchored in the car without the necessity of securing chocks and the like to the floor thereof and consequently, the floor is not damaged and no spikes are left standing therein as now often occurs.

This anchoring means can quickly and easily be detached from the sides of the car when it is desired to use the car for purposes other than the shipment of vehicles. Therefore, it will be seen that this detachable anchoring means is very advantageous. Moreover, the use of this device is not limited to cars of special construction, and it is obvious that the rods 2 may be hooked into ordinary staples in lieu of the eyes 4, and such staples may be driven into the car wall at any convenient place after the automobile is properly located in the car and has the device attached thereto. In this connection it should be understood that it is the automobile, and not the car, that mainly supports the anchoring device; for the automobile wheels support the concave shoes or cups 14, being fixed thereto by means of the straps 15, and the arms 12 and bar 1 are fixed to and supported in the horizontal position by these elements 14 and 15. Therefore, even if the rods 2 should become unhooked, from the car wall, the wheels would be held against rotation, also against turning horizontally with relation to one another. This is true because each bar 1 is rigidly connected to both wheels of one side of the automobile, and rigidly unites these wheels, and for the same reason, one of the bars 1 and its adjuncts will hold the automobile against any ordinary tendency to shift its position; the two being used only as a precaution against unusual tendencies.

Since probably the best results are obtained from the several details shown and described, they are by preference followed, but within the scope of the invention as claimed, considerable latitude is allowed for making such changes as occasion may dictate.

I claim:

1. In combination with a railway car, a pair of longitudinal bars above the floor thereof adapted to extend along opposite sides of a vehicle in said car, anchoring rods secured to said bars, means for detachably securing said rods to the car, and means adjustable along said bars and engageable with the vehicle to anchor the latter.

2. In combination with a railway car, a pair of longitudinal bars above the floor thereof adapted to extend along opposite sides of a vehicle in the car, anchor rods on the ends of said bars having hooks at their outer ends, eyes carried by the sides of the car and receiving said hooks to anchor said bars, and means adjustable along said bars for engagement with the vehicle to anchor the latter.

3. In a device for securing a vehicle's wheels in a fixed position relative to one another, a bar, and means rigidly connecting said bar with a front wheel and a rear wheel in such relation that said bar is mainly supported by the wheels and substantially prevents their movement with relation to one another.

4. In a device for securing a vehicle's wheels in a fixed position relative to one another, a wheel-embracing device secured to and supported by a front wheel of the vehicle, a wheel-embracing device secured to and supported by a rear wheel of the vehicle, and a bar connecting the first and second mentioned wheel-embracing devices in such relation as to hold said front and rear wheels substantially fixed with relation to one another.

5. In a device for securing a vehicle's wheels in a fixed position relative to one another, a pair of concaved tire-receiving members each provided with a strap to embrace a wheel's felly to secure the tire-receiving members on a front wheel and rear wheel, respectively, so that the said members are supported by the wheels, a bar, and means rigidly securing said bar to said tire-receiving members.

6. In a device for securing a vehicle's wheels in a fixed position relative to one another, a pair of channel-shaped and longitudinally curved tire-receiving members adapted to embrace a tread portion and two opposite side portions of a tire, means to secure said members in their tire-embracing positions on a front and rear tire, respectively, so that they are supported by said tires, a bar, and means to rigidly connect said bar with both of said channel-shaped members.

7. In a device for securing a vehicle's wheels in a fixed position relative to one another, a bar, means rigidly connecting said bar with a front wheel and a rear wheel in such relation that said bar is entirely supported by the wheels and substantially prevents their movement with relation to one another, and means to connect said bar to a wall for preventing longitudinal movement of the bar and of the vehicle which supports said bar.

8. In a device for securing a vehicle in a railway car, a bar adapted to be secured to the car and extend longitudinally thereof, a vehicle engaging member to be disposed in the path of movement of the vehicle, and a connecting member formed of a single strip of metal and having its middle part formed into a closed loop to receive said bar and to be adjustable along the latter, the end portions of said strip being extended in opposite directions and secured to said vehicle-engaging member, the remaining portions of said strip being parallel and juxtaposed and forming an arm that connects said loop to said end portions.

9. In combination with a railway car, a pair of longitudinal bars above the floor thereof adapted to extend along opposite sides of a vehicle in the car, anchor rods on the ends of said bars having hooks at their outer ends, eyes carried by the sides of the car and receiving said hooks to anchor said bars, slides adjustable along said bars, arms extending laterally from said slides, and channel-shaped shoes on the free ends of said arms adapted for engagement with the vehicle wheels to anchor the same.

In testimony whereof I have hereunto set my hand.

ORLA O. WILCOX.